US007000104B2

(12) United States Patent
Shimada

(10) Patent No.: US 7,000,104 B2
(45) Date of Patent: Feb. 14, 2006

(54) TERMINAL DEVICE FOR AUTHORIZING USE OF CONTENT DISTRIBUTED THROUGH A NETWORK

(75) Inventor: Muneki Shimada, Tokyo (JP)

(73) Assignee: Sony Computer Entertainment Inc., (JP)

( * ) Notice: Subject to any disclaimer, the term of this patent is extended or adjusted under 35 U.S.C. 154(b) by 853 days.

(21) Appl. No.: 10/003,634

(22) Filed: Nov. 2, 2001

(65) Prior Publication Data

US 2002/0083326 A1 Jun. 27, 2002

(30) Foreign Application Priority Data

Nov. 2, 2000 (JP) ............................ 2000-336541
Oct. 30, 2001 (JP) ............................ 2001-333460

(51) Int. Cl.
*G06F 1/24* (2006.01)

(52) U.S. Cl. ...................... 713/153; 713/193; 713/200; 713/201

(58) Field of Classification Search ................ 713/153, 713/193, 200, 201; 380/285
See application file for complete search history.

(56) References Cited

U.S. PATENT DOCUMENTS 5,991,804 A * 11/1999 Bolosky et al. ............. 709/221

FOREIGN PATENT DOCUMENTS

JP 10-161937 A1 6/1998
JP 11-212854 A1 8/1999
JP 11-259574 A1 9/1999
JP 2000-076135 A1 3/2000
JP 2000-122539 A1 4/2000
JP 2000-216773 A1 8/2000
JP 2000-259421 A1 9/2000
JP 2000-268096 A1 9/2000

OTHER PUBLICATIONS

Garfinkel, S. and Spafford, G., "Practical UNIX Security", Jan. 1, 1993, pp. 101-119, 164-169.
Bryan Costales, "Sendmail", pp. 239-249 and 269-274, O'Reill & Associates, Inc., date unknown.

* cited by examiner

*Primary Examiner*—Thomas R. Peeso
(74) *Attorney, Agent, or Firm*—Lerner, David, Littenberg, Krumholz & Mentlik, LLP

(57) ABSTRACT

When content is downloaded, the terminal device writes such content into a data storage region only accessible by a system application program. Upon completion of formal procedures, the terminal device decodes the content stored in the data storage region into an another region from which the content can only be read out using a user application program. This successfully prevents unauthorized use of the content as far as it resides in the data storage region, and ensures safe content distribution through a network.

37 Claims, 10 Drawing Sheets

TERMINAL DEVICE FOR AUTHORIZING USE OF CONTENT DISTRIBUTED THROUGH A NETWORK

CROSS-REFERENCE TO RELATED APPLICATIONS

The present application claims priority from Japanese Patent Application Nos. 2000-336541 filed on Nov. 2, 2000 and 2001-333460 filed on Oct. 30, 2001, the disclosures of which are hereby incorporated by reference herein.

BACKGROUND OF THE INVENTION

The present invention relates to a terminal device and an entertainment system for distributing various contents such as video game, movie, news and music; a method for managing such contents; a storage medium having recorded therein an information processing program; and a information processing program.

Besides the conventional way of distributing music data, game programs or other contents in a form of being stored in a storage medium such as CD-ROM, DVD-ROM and semiconductor memory, downloading using a personal computer of the user is becoming popular.

More specifically, for a case of downloading a desired content, the user makes an access from its own personal computer using a web browser stored therein to a predetermined server machine, and sends a request for distributing the desired content. The server machine then distributes the content requested by the user via a network to the personal computer of such user. On the side of the personal computer, the content distributed from the server machine is stored in a storage medium such as hard disk (HD). The user can thus obtain the desired content without using a storage medium such as CD-ROM or DVD-ROM.

In the previous system, the user could freely access the content once it was downloaded into the personal computer, since the content was stored in a region in the hard disk which is accessible using a user application program. Thus the previous content once downloaded into the personal computer could freely be used or enjoyed.

There is, of course, no limitation on free access to the downloaded content by a user formally paid the charge for the use or enjoyment. It has, however, been difficult to prevent unauthorized use such that downloading the content in an illegal manner, or such that paying no charge despite the downloading of the content is permitted under promise of post payment.

It is, however, predicted that distribution of content through network will grow more prosperous in the future, and such network distribution and unauthorized use will unfortunately become more apparent in the future.

SUMMARY OF THE INVENTION

The present invention was proposed to solve the foregoing problems, and an object thereof resides in that providing a terminal device, an entertainment system, a method for managing content, and a storage medium having recorded therein an information processing program, all of which are aimed at preventing unauthorized use of contents distributed through a network.

To solve the foregoing problems, in the present invention downloaded content is written into or read out from a first region of a storage unit which allows only a system program to write or read, so that the content downloaded into the storage unit is once stored therein in a form which cannot be referred to by a user application. This enables downloading of content into the storage unit while successfully preventing unauthorized access to such content.

The content written into the first region is decoded into a second region from which a user application program can read out only, for example, when the user has paid the charge for the downloaded content. This enables access based on a user application to the downloaded content, and allows the user to use the downloaded content.

According to the present invention, the user cannot use the content at the point of time the content is just downloaded into the user's terminal device, which ensures downloading of contents while preventing unauthorized use thereof.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DETAILED DESCRIPTION

Figure 1:
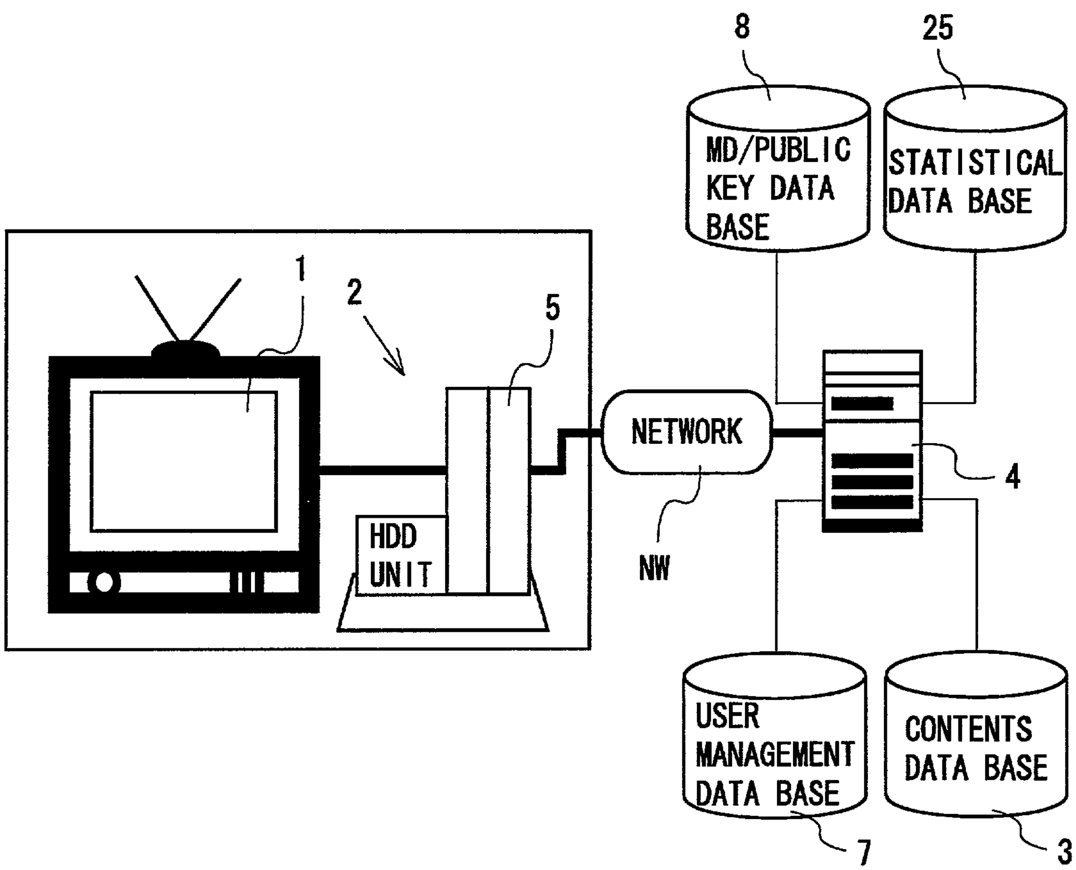
FIG. 1 is a block diagram of an entertainment system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Constitution of an Embodiment

An entertainment system according to an embodiment of the present invention is composed of, as shown in FIG. 1, a domestic client terminal device 2 connected to a television image receiver 1 provided to each user's home, and a server machine 4 provided with a contents data base 3 storing various contents such as video game, movie, news and music; both of which are connected with each other via a network NW such as LAN (Local Area Network) including internet, internet protocol, cable internet, xDSL (x Digital Subscriber Line), Ethernet and token ring, or WAN (Wide Area Network).

The domestic client terminal device 2 comprises a main game unit 5 and a hard disk drive unit 6 (HDD unit).

Figure 2:
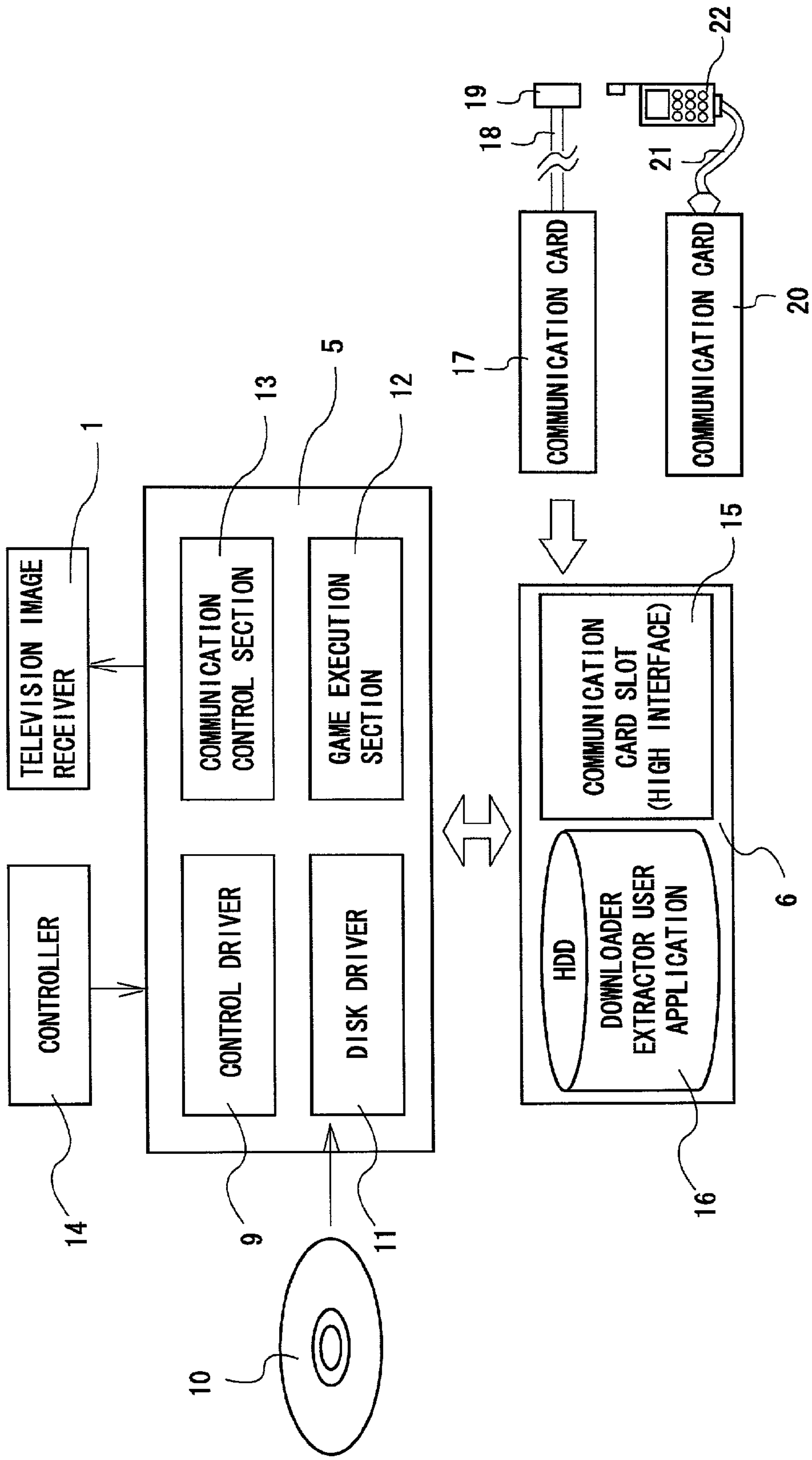
FIG. 2 is a block diagram of a domestic client terminal device composing the entertainment system.

FIG. 2 is a block diagram showing a specific constitution of such main game unit 5 and the HDD unit 6. As is clear from FIG. 2, the main game unit 5 comprises a disk driver 11 for reproducing a program or data of a video game from a physical medium 10 such as a DVD-ROM or CD-ROM, a game execution section 12 for executing a video game based on the program or data of the video game reproduced by the disk driver 11, a communication control section 13 for controlling communication of various contents such as video game, movie, news and music, details of which will be described later, and a control section 9 for controlling an entire portion of the domestic client terminal device 2.

The game execution section 12 is provided for forming a game image of a video game in response to operation of a controller by the user and outputting such image to the television image receiver 1 to display, by parallel rendering engine.

The game execution section 12 is designed to reproduce sound of DVD video, CD and the like besides video game sound in order to provide such sound to the television image receiver 1.

The communication control section 13 is provided for establishing a push-style or pull-style connection via the network NW to the server machine 4, to thereby control downloading of various contents into the HDD unit 6.

The HDD unit 6 mainly comprises a hard disk drive 16 (HDD) having a capacity of as large as 30 GB or 60 GB and a communication card slot 15.

The HDD 16 stores system programs such as "downloader" and "extractor", and a predetermined user application program. The "downloader" is a program for downloading various contents by communicating with the server machine 4 on the network NW. The "extractor" is also a program for decoding the various contents downloaded in an archived manner into a predetermined region of the HDD 16.

The communication card slot 15 is a high-speed interface allowing insertional connection of a communication card 17 for telephone line or a communication card 20 for mobile phone. The communication card 17 for telephone line can be connected to a telephone line provided for a user's home via a modular cable 18 and a modular jack 19, by which wire communication is established between the domestic client terminal device 2 and the server machine 4. On the other hand, the communication card 20 for mobile phone can be connected to a mobile phone 22 via a communication cable 21, by which wireless communication is established between the domestic client terminal device 2 and the server machine 4.

The entertainment system can support both of wire communication and wireless communication, and operations and effects thereof are similar in both communication modes except that the content is downloaded via wire or wireless wave. It should now be noted that the description below deals with the system based on wireless communication as a representative case.

Operation of an Embodiment

The entertainment system is available only after the user makes a monthly payment contract with a system administrator, always keeps the power switch ON even when a game is not played, and set the user's own domestic client terminal device 2 so as to be connected to the server machine 4 using the communication card 17 for telephone line or the communication card 20 for mobile phone as shown in FIG. 2.

Such entertainment system allows downloading of various contents according to a schedule set by the user or set on the server side.

For the case that various contents are downloaded according to a schedule set on the server side, either downloading under so-called, pull-type connection or push-type connection is available, wherein the domestic client terminal device 2 accesses the server machine 4 in the former, and the server machine 4 accesses the domestic client terminal device 2 in the latter.

Figure 3:
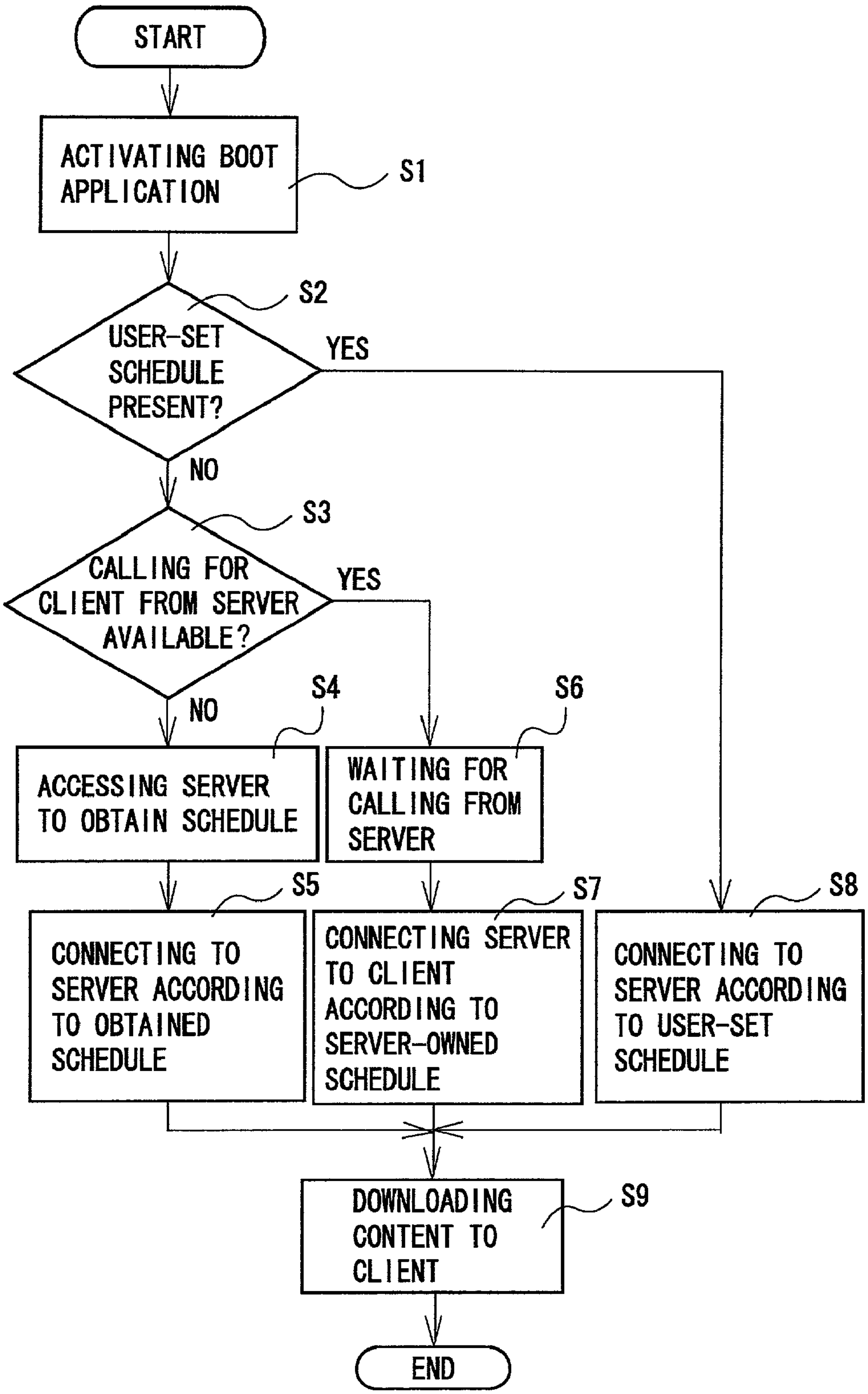
FIG. 3 is a flow chart for explaining a schedule-governed downloading proceeds in the entertainment system.

A flow chart in FIG. 3 shows a process flow of downloading under the individual connection styles, in which a flow along step S1→step S2→step S8→step S9 indicates a process flow until the downloading is completed according to a schedule set by the user.

The process flow shown in FIG. 3 starts when a main power source of the domestic client terminal device 2 is turned ON by the user, which is followed by a process in step S1. In step S1, the control section 9 shown in FIG. 2, a main power source of which is turned ON, activates a boot application program stored in the HDD 16 of the HDD unit 6, and also activates "downloader" and "extractor", which is followed by a process in step S2.

In step S2, the control section 9 determines whether a schedule set by the user is present or not, and the process goes to step S8 if the schedule is present (YES), and goes to step S3 if absent (NO).

More specifically, when the user joins the system, the user will receive from the system administrator side a magazine or an e-mail which contains guide of contents to be distributed, and schedule of their distribution period or time. Observing such schedule, the user selects a desired content and enters using the controller 14 a desired date and time of downloading of such content. The control section 9 manages an identification of the content and the specified date and time of downloading as "a user-set schedule".

When the date and time set by the user comes, the communication control section 13 makes, in step S8, the domestic client terminal device 2 access the server machine 4 based on the "downloader", and the process then goes to step S9. Thus in step S9, a content selected by the user will be downloaded according to a schedule set by such user at the time specified by such user.

The downloaded content is supplied, under communication control by the communication control section 13, via the communication card 17 and the communication card slot 15 to the HDD 16, and is then stored under control of the control section 9 into a predetermined region (writable region in FIG. 7) of the HDD 16 described later.

Next, a process flow of downloading under the pull-type connection style according to a schedule set by the server machine 4 side will be described, in which the process flows as step S1→step S2→step S3→step S4→step S5→step S9.

When it is determined in step S2 that the user-set schedule is absent, the process goes to step S3. In step S3, it is necessary to obtain a schedule according to which the domestic client terminal device 2 operates, so that the communication control section 13 discriminates whether the domestic client terminal device 2 is set in a state accessible by the server machine 4 (that is, whether the domestic client terminal device 2 is set so as to accept "push" from the server machine 4), and the process goes to step S6 if YES, or goes to step S4 if NO.

Setting of whether the "push" from the server machine 4 will be accepted or not can interactively be done as being guided by an interactive-type set screen on the television image receiver 1 through operating the controller 14, where either selection of "setting for accepting push from the server machine 4" or "setting for refusing push from the server machine 4, but allowing only pull-type connection to such server machine 4 from the domestic client terminal device 2" is optional.

For the case that the domestic client terminal device 2 has the "setting for accepting push from the server machine 4", the discrimination in step S3 will be YES and the process goes to step S6, and for the case that the domestic client terminal device 2 has the "setting for refusing push from the server machine 4, but allowing only pull-type connection to such server machine 4 from the domestic client terminal device 2", the discrimination in step S3 will be NO and the process goes to step S4.

In step S4, the communication control section 13 makes an access from the domestic client terminal device 2 to the server machine 4 based on the "downloader" since the domestic client terminal device 2 is set so as to refuse push from the server machine 4, and downloads a schedule file prepared on the server machine 4 side into the HDD 16. The schedule file is not always common to all users but properly arranged for the individual clients depending on taste or desire of the users, details of which will be described later.

The communication control section 13 is so designed to make access to the server machine 4 in a periodical manner (polling), so that a latest schedule file can be downloaded into the HDD 16 for every access.

Next in step S5, the communication control section 13 makes an access to the server machine 4 at the time scheduled on the server machine 4 side according to the schedule file obtained in step S4, and the process goes to step S9. Thus in step S9, a content selected by the user will be downloaded into the HDD 16 according to a schedule set on the server machine 4 side at the time specified on the server machine 4 side.

Figure 4:
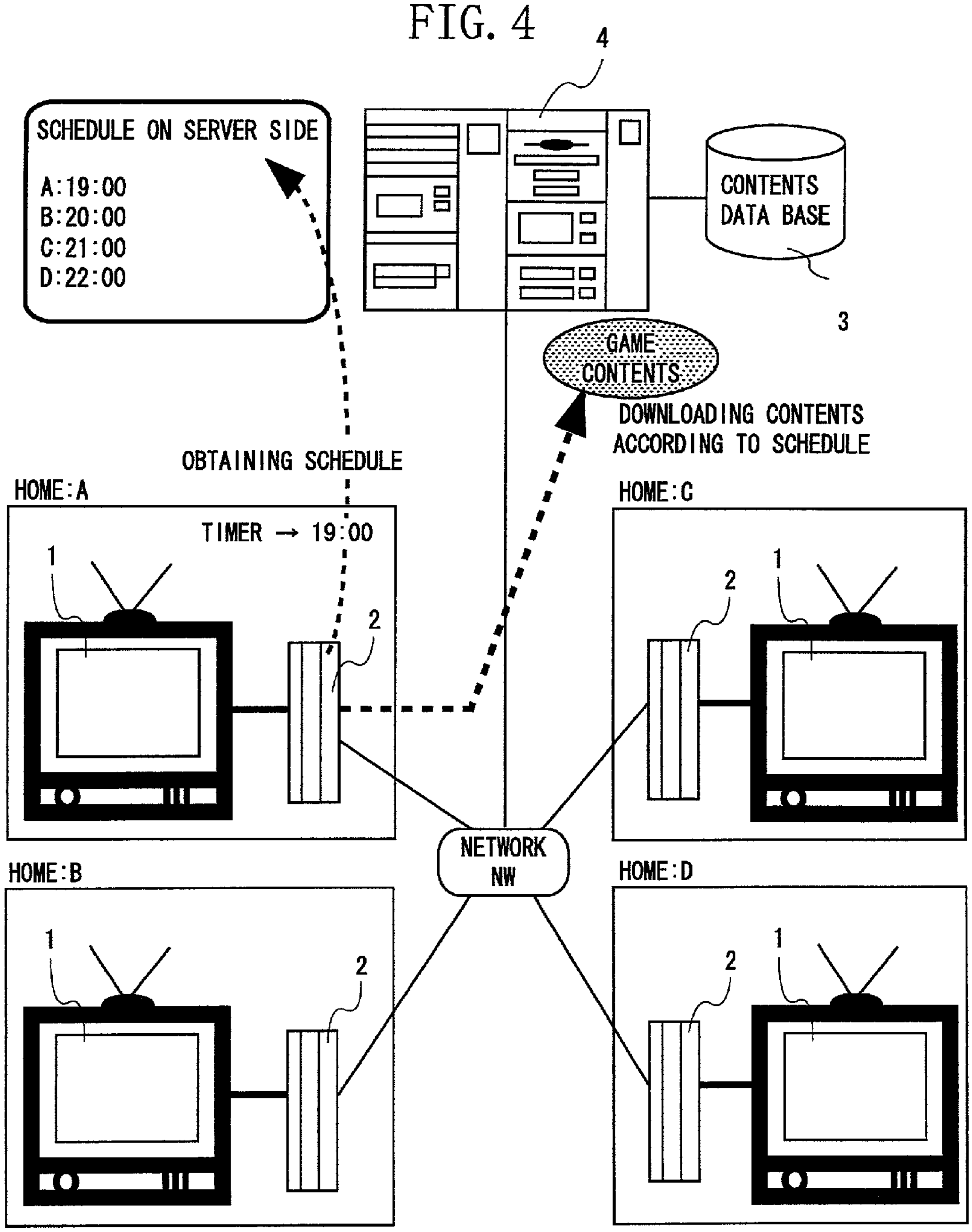
FIG. 4 is a schematic drawing for explaining downloading of a content through a domestic client terminal device under a pull-type connection in the entertainment system.

FIG. 4 is a schematic drawing showing the downloading of content under such pull-type connection. In such drawing showing an exemplary case of downloading a game content from the server machine 4, the individual domestic client terminal devices 2 at the individual users' homes A to D periodically make access to the server machine 4 to thereby download schedules determined on such server machine 4 side.

In this exemplary case, allowable downloading time is assigned to each of the users' homes A to D, such as for example 19:00 for user's home A, 20:00 for user's home B, 21:00 for user's home C and 22:00 for user's home D.

Thus the domestic client terminal device 2 at user's home A makes an access to the server machine 4 at 19:00, by which a predetermined game content is downloaded from such server machine 4 to the domestic client terminal device 2 at user's home A.

Similarly, the individual domestic client terminal devices 2 at users homes B, C and D make access to the server machine 4 at 20:00, 21:00 and 22:00, respectively, by which predetermined game contents are downloaded from such server machine 4 to the individual domestic client terminals 2 at users' homes B, C and D, in a time differential manner.

The downloaded content is supplied, under communication control by the communication control section 13, via the communication card 17 and the communication card slot 15 to the HDD 16, and is then stored under control of the control section 9 into a predetermined region (writable region in FIG. 7) of the HDD 16 described later.

While the downloading time is adjusted for every user's home A to D in the above exemplary case, it is also allowable that the downloading time is adjusted for every district.

A network has only a limited traffic and the downloading may be disabled due to delayed communication speed or over-capacity of the communication line if a huge number of users make accesses to the server machine 4 at a time to request downloading of desired contents. On the contrary, the assignment of the downloading time for the individual users (or the individual districts) and the adjustment of the downloading in a time differential manner as described in the above can make an effective use of the limitative traffic of the network and can thus ensure smooth downloading of desired contents.

A process flow along step S1→step S2→step S3→step S6→step S7→step S9 in FIG. 3 indicates a process flow until the downloading under the push-type connection is completed according to a schedule set on the server machine 4 side.

When it is determined in step S2 that the user-set schedule is absent, and is then further determined in step S3 that the domestic client terminal device 2 is set so as to accept "push" from the server machine 4, the process goes to step S6.

In step S6, the communication control section 13 goes into a wait calling status since the domestic client terminal device 2 is set so as to accept "push" from the server machine 4, and the process goes to step S7 upon receiving calling from the server machine 4.

In step S7, the server machine 4 makes accesses in a time differential manner to the individual domestic client terminal devices 2 according to the schedules assigned for the individual users, and the process goes to step S9. The individual domestic client terminal devices 2 are set so as to accept connection request from the server machine 4 according to the "downloader", and download in step S9, upon establishing the connection, content distributed at the time scheduled on the server machine 4 side into the HDD 16.

Figure 5:
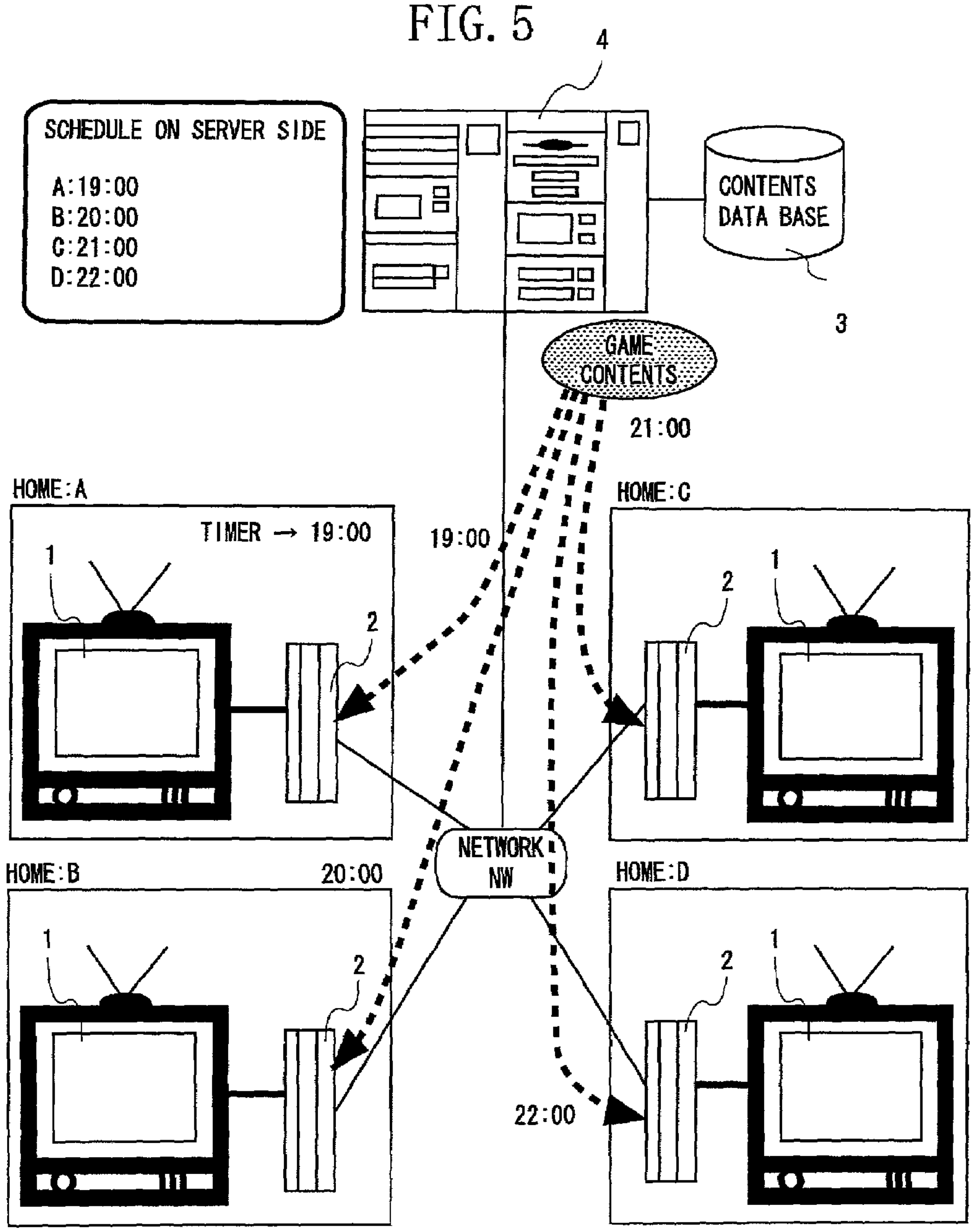
FIG. 5 is a schematic drawing for explaining downloading of a content from a server machine under a push-type connection in the entertainment system.

FIG. 5 is a schematic drawing showing the content distribution under the push-type connection. FIG. 5 shows an exemplary case in which a game content is distributed from the server machine 4, where allowable downloading time is assigned to each of the users' homes A to D, such as for example 19:00 for user's home A, 20:00 for user's home B, 21:00 for user's home C and 22:00 for user's home D.

Thus the server machine 4 makes an access to the domestic client terminal device 2 at user's home A at 19:00, by which a predetermined game content is downloaded from such server machine 4 to the domestic client terminal device 2 at user's home A.

Similarly, the server machine 4 makes accesses to the individual domestic client terminal devices 2 at users' homes B, C and D at 20:00, 21:00 and 22:00, respectively, by which predetermined game contents are downloaded from such server machine 4 to the individual domestic client terminals 2 at users' homes B, C and D in a time differential manner.

The downloaded content is supplied, under communication control by the communication control section 13, via the communication card 17 and the communication card slot 15 to the HDD 16, and is then stored under control of the control section 9 into a predetermined region (writable region in FIG. 7) of the HDD 16 described later.

While the downloading time is adjusted for every user's home in the above exemplary case, it is also allowable that the downloading time is adjusted for every district.

While in the case of the foregoing downloading under the pull-type connection, it was necessary to previously obtain on the domestic client terminal device 2 side a schedule on the server machine 4 side, the downloading under such push-type connection does not require previous obtainment of the schedule or schedule management on the domestic client terminal device 2 side, since the schedule management is conducted on the server machine 4 side and such server machine 4 makes access to a predetermined domestic client terminal device 2 to thereby distribute the content when the specified time comes.

This also allows an effective use of the limitative traffic of the network and can thus ensure smooth downloading of desired contents since the downloading times are assigned for the individual users (or the individual districts) and the contents are distributed in a time differential manner.

In such entertainment system of this embodiment capable of distributing the schedule file and contents in a time differential manner, the server machine 4 is designed to adjust the distribution time depending on the congestion status of the network and the member level of the users.

Figure 6:
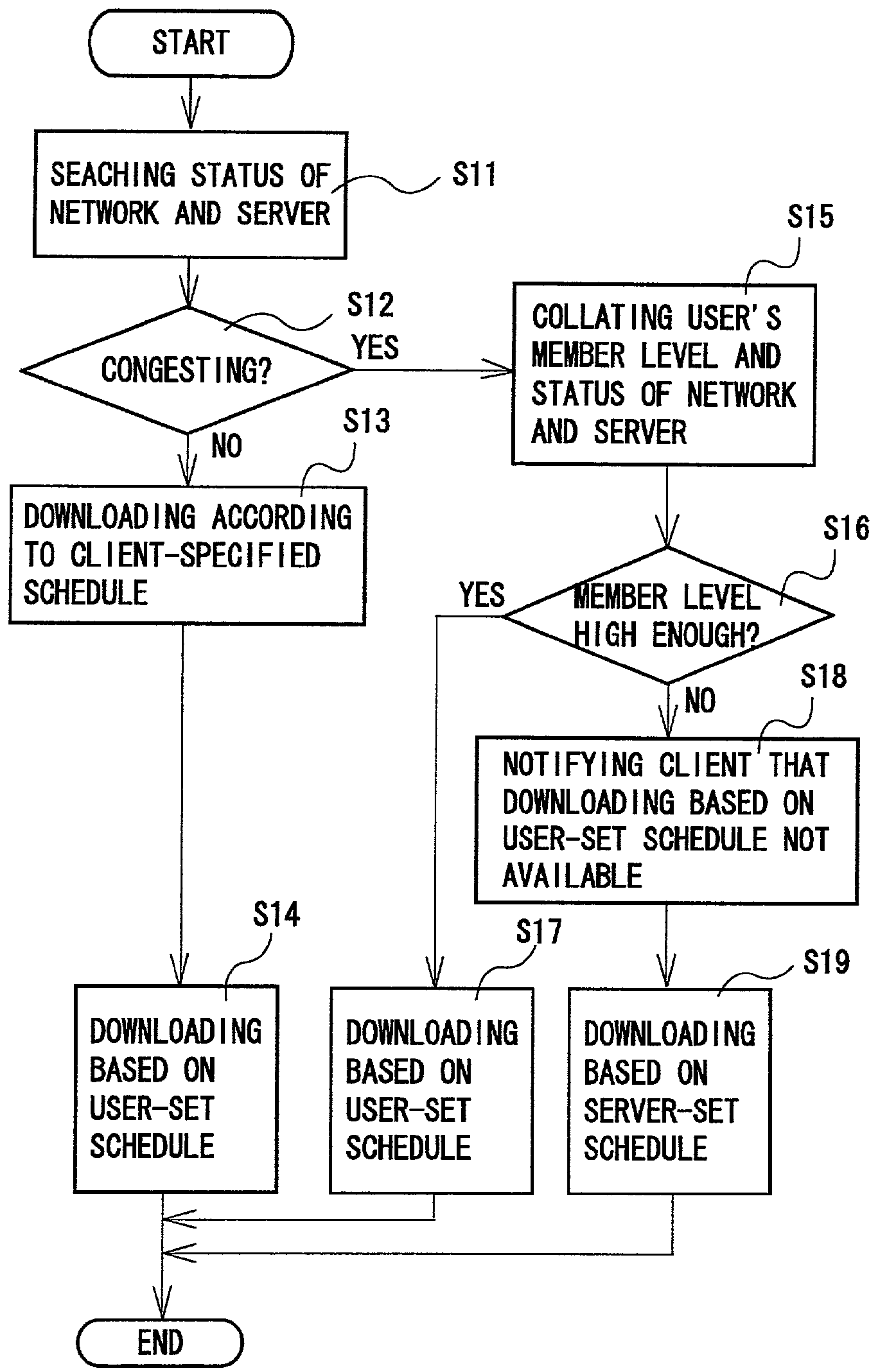
FIG. 6 is a flow chart for explaining downloading of a content in the entertainment system, which is proceeded in response to congestion status of a network and a member level.

A flow chart in FIG. 6 shows a process flow of downloading the schedule file and the contents from the server machine 4 to the domestic client terminal device 2 depending on the congestion status of the network and the member level of the users, in which a flow along step S11→step S12→step S13→step S14 indicates a process flow of downloading when the network capacity is still available.

The process of the flow chart of FIG. 6 starts in the cases described below, which is followed by the process in step S11:

(1) a user-set schedule was discriminated as present in step S2 in FIG. 3, an access was made in step S8 from the domestic client terminal device 2 to the server machine 4 according to the user-set schedule, so that the server machine 4 is ready to distribute the content in response to such access;

(2) a user-set schedule was discriminated as absent in step S2 in FIG. 3, the domestic client terminal device 2 is discriminated in step S3 as being set to refuse push from the server machine 4, an access was made in step S4 from the domestic client terminal device 2 to the server machine 4, so that the server machine 4 is ready to distribute a schedule file in response to such access;

(3) a user-set schedule was discriminated as absent in step S2 in FIG. 3, the domestic client terminal device 2 is discriminated in step S3 as being set to refuse push from the server machine 4, an access was made in step S5 to the server machine 4 according to the schedule file obtained in step S4, so that the server machine 4 is ready to distribute the content in response to such access; and (4) a user-set schedule was discriminated as absent in step S2 in FIG. 3, the domestic client terminal device 2 is discriminated in step S3 as being set to accept push from the server machine 4, an access request issued from the server machine 4 is accepted by the domestic client terminal device 2 in steps S6 and S7, so that the server machine 4 is ready to distribute the content in response to such access.

In step S11, the server machine 4 first searches the current congestion status of the network servers, which is followed by the process in step S12.

In step S12, the server machine 4 determines based on the current congestion status searched in step S11 whether the network is currently congested or not, where the process goes to step S15 when the network is not congested (in the case of NO), and goes to step S13 or step S14 when congested (in the case of YES).

Step S13 will be reached for the case that the user-set schedule is absent, and the domestic client terminal device 2 made an access to the server machine 4 in order to obtain a schedule file, or for the case that a distribution request for a predetermined content was issued from the domestic client terminal device 2 based on the obtained schedule file.

In such step S13, the server machine 4 distributes the schedule file or content in response to the request from the domestic client terminal device 2 since the network is not currently congested.

On the contrary, step S14 will be reached for the case that the user-set schedule is present. In such step S14, the server machine 4 distributes the schedule file or content according to the user's desired schedule since the network is not currently congested.

On the other hand, when the network was discriminated in step S12 as being currently congested, the server machine 4 collates in step S15 the current congestion states of the network and the server machine 4 itself with the member level of the user who issued the distribution request for the schedule file or content, which is followed by the process in step S16.

The member level is determined based on various factors such as the number of access by such user (access frequency), communication speed of the communication line, priority of the server machine 4 or the domestic client terminal device 2, and paid charge (classified as a special member or a general member depending on the paid charge). The member level is stored in a user management data base 7 shown in FIG. 1, and the server machine 4 properly reads out a member level of the relevant user from such user management data base 7 to thereby allow the collation in step S15 to proceed.

In step S16, whether a member level of the user currently issuing the distribution request for the schedule file or content is high enough or not is discriminated based on the collation result in step S15, where the process goes to step S17 for the case the member level of the user is high enough (for the case of YES), and goes to step S18 for the case the member level of the user is low (for the case of NO).

In step S17, the server machine 4 distributes the schedule file or content to the user who is given a priority over other users irrespective of the current congestion status of the network since the member level of such user is high enough.

On the contrary in step S18, the server machine 4 sends a notice for announcing impossibility in immediate distribution to the domestic client terminal device 2 of the user, since the member level of such user is low, where the notice typically appears as "Distribution of the content is not available due to network congestion. Distribution will start upon relieving the congestion. Sorry for waiting for a while.", which is followed by the process in step S19. Such notice is displayed on the television image receiver 1 after being mediated by the domestic client terminal device 2 of the user. Thus the user issued the distribution request recognizes the current congestion status of the network.

Even after issuing such notice, the server machine 4 continues the research of the congestion status of the network. The distribution of the schedule file or content is enabled in step S19 according to the schedule specified on the server machine 4 side only after the congestion status of the network is relieved so as to match the member level of such user.

As has been described in the above, the entertainment system of this embodiment can regulate distribution of the schedule file or content depending on the congestion status of the network and the member level of the user. This successfully prevents congestion of the network having a limited capacity, and ensures an effective use thereof.

On the other hand, a prompt distribution of the schedule file or content irrespective of the congestion status of the network is permitted to the users having higher member levels. Such discrimination of the users having higher member levels from the general users in the distribution of the schedule file or content can ensure satisfaction of such special users having higher member levels.

Such provision of the special service to the users having higher member levels is also advantageous in that promoting the use of such system, joining to the system as a special member not as a general member, and switching from a general member to a special member.

The entertainment system of this embodiment manages the downloaded content with the aid of a novel system constitution as described in the next.

Figure 7:
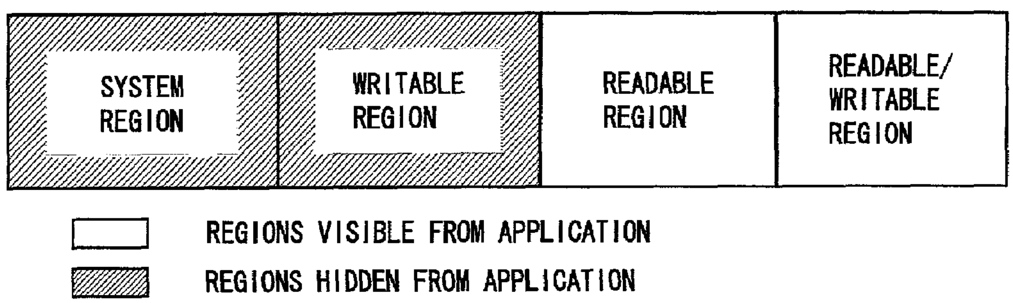
FIG. 7 is a drawing for explaining a recording/reproduction region of a hard disk provided to the domestic client terminal device in the entertainment system.

The entire storage region of the HDD 16 of the entertainment system is divided into "system region", "writable region", "readable region" and "readable/writable region" as shown in FIG. 7. Among these, the "system region" and "writable region" hatched in the drawing are not accessible by the user application program and is only accessible by the system programs, such as "downloader" and "extractor", of such entertainment system.

On the contrary, the "readable region" and "readable/writable region" are accessible by any of the system programs such as "downloader" and "extractor", and the user application program.

The "system region" stores the system programs such as "downloader" and "extractor", and set data referred by the system programs. The system programs stored in the "system region" cannot be referred by the user application program as described in the above.

The "writable region", which allows write-in and read-out using the system application programs, is a data storage area dedicated for such system application programs.

The "readable region" is accessible both by the system application programs and user application program, where write-in and read-out are allowable through the system application program and only read-out is allowable through the user application program.

The "readable/writable region" allows write-in and read-out through both of the system programs and user application program, where data written in the region is completely erased at a timing not participable by the user application program when, for example, the domestic client terminal device 2 is re-activated. Thus the "readable/writable region" can be said as a so-called "temporary data region".

The content distributed from the server machine 4 is previously subjected to encryption and compression, to thereby have a secured style of archiving (archived content). Examples of contents distributable in an archived style include application program of game, additional data or patch data for game, shareware (trial program), interactive commercial program, and moving picture data of news, movie, and commercial.

Figure 8:
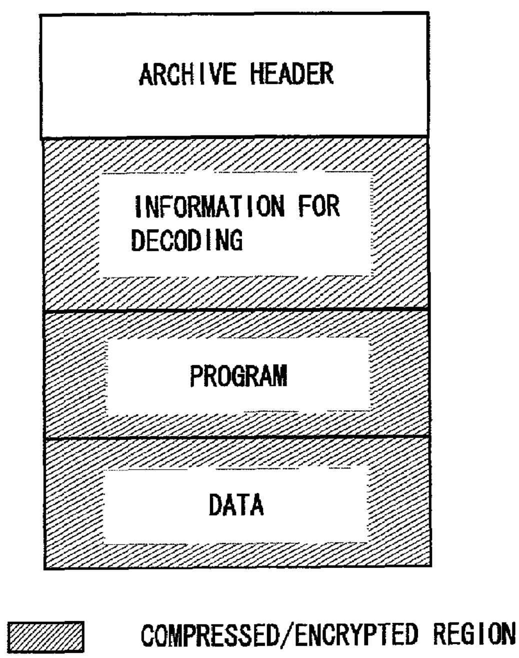
FIG. 8 is a drawing for explaining a data constitution of an archived content downloaded into the domestic client terminal device.

FIG. 8 is a schematic drawing showing a constitution of such archived content. As is clear from FIG. 8, the archived content comprises "an archive header", "information for decoding", "a program" and "data".

Among these, information for the "archive header" is not encrypted nor compressed, and is reproducible without decoding or expansion. The "archive header" contains information indicating the identification of the archived content, such that indicating that the archived content is that for a commercial, a movie or the like.

As is described in the above, information of the "archive header" is not encrypted nor compressed, and is reproducible without decoding or expansion, so that when the content is downloaded into the HDD 16, only the "archive header" is reproduced and displayed for the user. The user then inspects the archive header and selects contents while considering whether the archived content is necessary or not. If the user considers a certain archived content as necessary and completes predetermined procedures such as paying the charge therefor, the user will be given with a public key from the system administrator. The "information for decoding", "program" and "data" become reproducible with such public key, and the "program" and "data" are expanded and reproduced based on the "information for decoding" (together with the "archive header").

FIGS. 9A to 9E are schematic drawings showing the decoding of such archived content.

Figure 9A:
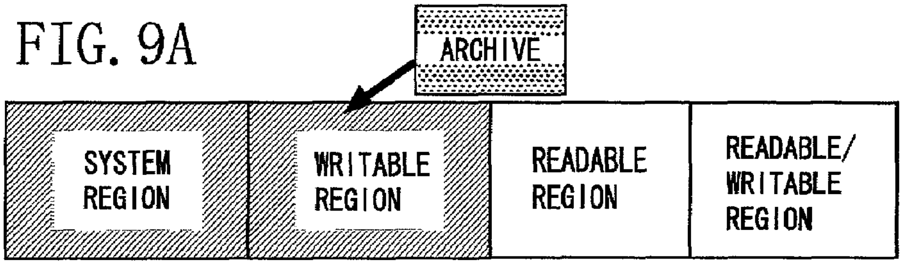
FIGS. 9A to 9E are drawings for explaining write-in and decoding of the archived content downloaded into the domestic client terminal device.

For the case of such entertainment system, an archived content is first downloaded from the server machine 4 into the HDD unit 6, and the "downloader" writes the downloaded archived content into the "writable region" of the HDD 16, as shown in FIG. 9A.

Since the archived content written in the "writable region" is not accessible by the user application program as described in the above, the user cannot use such downloaded archived content at this point of time.

The "archive header" in the archived content is, however, not encrypted and compressed, so that it is reproducible by the user application program and can be displayed on the television image receiver 1. Thus the user can recognize only an outline of the archived content downloaded into its own domestic client terminal device 2.

Next, the user selects the archived content based on the outline thereof. If the user determines the archived content as unnecessary and specifies deletion of such content through operation of the controller 14, the system program will delete the archived content written in the "writable region" of the HDD 16.

On the other hand, if the user determines the archived content as necessary and completes predetermined procedures such as paying the charge therefor, the user will receive a public key from the system administrator in sealed cover through a postal service or through transmission from the server machine 4 to the domestic client terminal device 2.

When the public key is received through a postal service, the user operates the controller 14 to enter the public key. Upon entering the public key, the "extractor" activates. Or, the "extractor" activates when the public key sent from the server machine 4 is received by the domestic client terminal device 2.

Figure 9B:
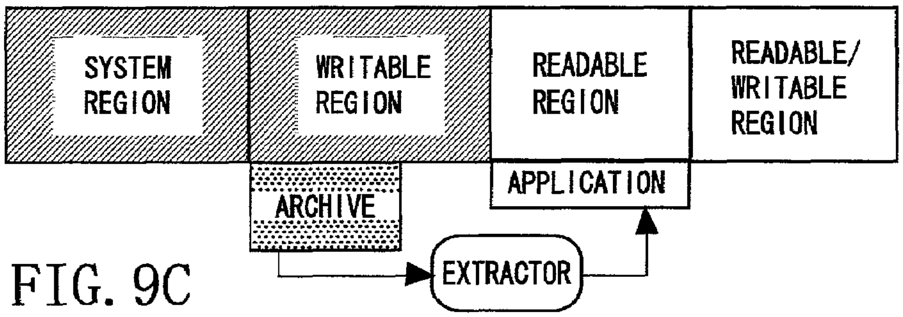
Figure 9C:
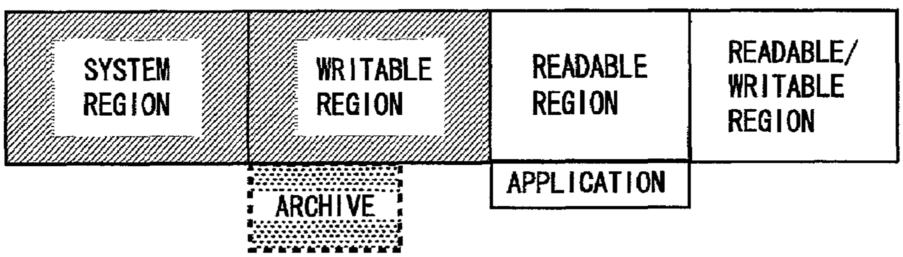

The "extractor" conducts decoding correlative to the encryption given to the "information for decoding", "program" and "data" of the archived content based on the public key, then expands and reproduces the "program" and "data" based on the decoded "information for decoding" (together with "archive header"), to thereby decode the "program" and "data", as "application", into the "writable region" of the HDD 16 as shown in FIG. 9B. The archived content in the "writable region" is deleted after the decoding as shown in FIG. 9C.

Figure 9D:
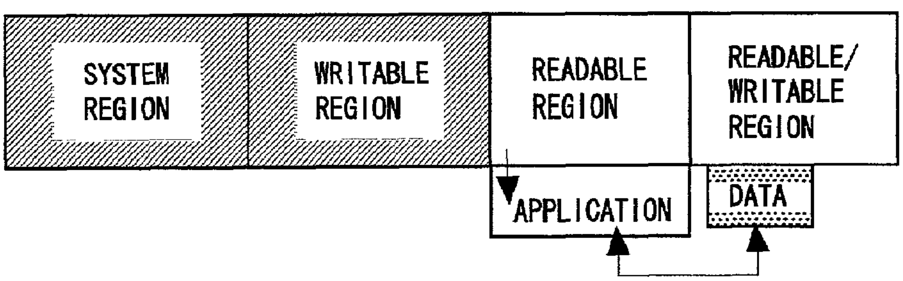

Upon completion of the decoding of "application" into the "writable region", the user application program then activates, by which the application decoded into the "writable region" is reproduced. Data generated by the user application program during such reproduction are written in the "readable/writable region" of the HDD 16 in a form of a "temporary data file" as shown in FIG. 9D.

Figure 9E:
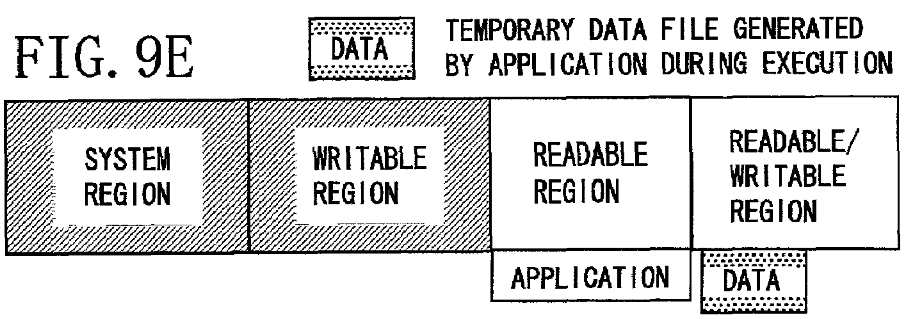

The "temporary data file" written in the "readable/writable region" is completely deleted later as shown in FIG. 9E, at a timing not participable by the user application program when, for example, the domestic client terminal device 2 is re-activated.

As has been described in the above, the entertainment system of this embodiment can distribute the content from the server machine 4 to the domestic client terminal device 2 in a predetermined form of "secured archived content", which is advantageous in that preventing a untrustworthy content possibly infected with a virus from being written in the HDD 16.

The entertainment system of this embodiment is designed so that contents are automatically downloaded into HDD 16 irrespective of that they are to be purchased or not, and only those for which the user completed the purchasing procedure will be decoded to be available, which is advantageous in that the user can decode and use the content immediately after the completion of the purchasing procedure without requesting the downloading.

Since the content is already downloaded into the HDD 16, it is no more necessary for the user to conduct complicated operations such that accessing the server machine in order to purchase the content, and the user can install (equivalent to the foregoing decoding) the content without intentionally downloading such content.

Since the contents are downloaded into the "writable region" to which the user application program is not accessible for read-out or write-in, so that the contents cannot be decoded nor used unless otherwise the user completes the purchasing procedure and is given a public key from a system administrator. This successfully prevents unauthorized use (enjoyment) of the contents.

Among the contents downloaded into the HDD 16, those not purchased are specified by the user through operating the controller 14 and deleted from the "writable region", so that undesirable accumulation of the unnecessary contents in the "writable region" of the HDD 16 is avoidable.

By such entertainment system, it may be possible that, for example, contents are downloaded into the user's domestic client terminal device 2 while the user being not aware of it such as during sleeping, and a desired content can be decoded and will become available without accessing the server machine 4. Thus the system will be impressed by the user as a quite surprising, convenient and absolutely novel one.

Figure 10:
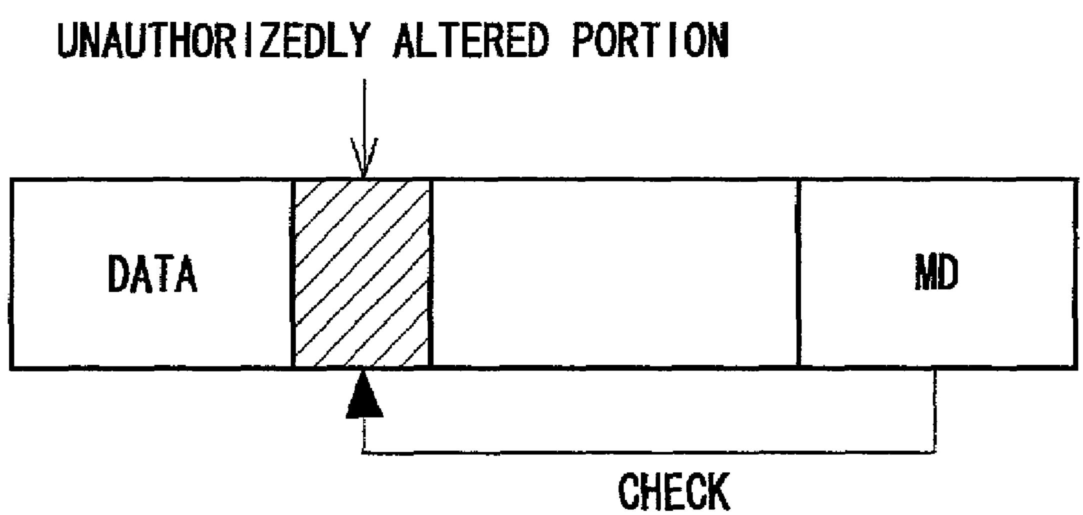
FIG. 10 is a drawing for explaining a message function value (MD) added to the archived content or a system program.

As has been described referring to FIG. 8, the archived content contains the "archive header", "information for decoding", "program" and "data", among which the "data" is added with a message digest function value (MD) as shown in FIG. 10. Such message digest function value is also added individually to the system programs such as "downloader" and "extractor".

When the application of the downloaded archived content is decoded into the "readable region" of the HDD 16, the "downloader" checks data string of the application using the message digest function value in a periodic or non-periodic manner. If an unauthorizedly altered portion as shown in FIG. 10 is detected, a message such as "The application has a sign of unauthorized alteration." is displayed for the user, and the application remains unavailable until the unauthorizedly altered portion is corrected.

The system programs such as "downloader" and "extractor" check their data strings using the message digest function values added thereto in a periodic or non-periodic manner. If an unauthorizedly altered portion is detected, a message such as "The system program has a sign of unauthorized alteration." is displayed using such system programs for the user, and various operations using such system programs, such as the downloading and decoding of the archived content, are terminated until the unauthorizedly altered portion is corrected.

This successfully prevents unauthorized use of various archived contents with the aid of an unauthorizedly altered program in the HDD. It is now also allowable to add a check-sum in place of the message digest function value, which will result in the same effect.

The entertainment system thus can detect unauthorized alteration of the system programs or user application program using the message digest function value, but the unauthorized alteration in, for example, the system programs cannot be detected if the message digest function value per se is unauthorizedly altered.

The encrypted archived content is decoded using the public key provided from the system administrator and is decoded from the "writable region" into the "readable region" in the HDD 16, where the archived content downloaded into the "writable region" can be used unauthorizedly and unlimitedly if the public key per se is unauthorizedly altered.

To overcome such problems, the server machine 4 of the entertainment system is provided with an MD/public key data base 8 for storing master data for the individual message digest function values (MDs) and the public key for the individual archived contents. The domestic client terminal device 2 makes connection with the server machine 4 in a periodic or non-periodic manner based on the system programs, and collates the message digest function value and the public key currently used with the master data of those stored in the MD/public key data base 8.

When a disagreement between the message digest function value or the public key currently used and the corresponding master data thereof is detected, the application is disabled or the system operation of the device is terminated assuming that the message digest function value or the public key is unauthorizedly altered. This successfully prevents the unauthorized use of the archived content downloaded into the "writable region" of the HDD 16 with the aid of the unauthorizedly altered message digest function value or the public key.

While in the above description of the embodiment the archived content is downloaded by connecting the domestic client terminal device 2 to the server machine 4 via the network NW, it is also allowable to install the content from the physical medium 10 such as a CD-ROM or DVD-ROM.

The physical medium 10 in the above exemplary case contains a complete program as the archived contents, where storing only a part of the program is also allowable. The physical medium 10 is distributed to the user free of charge or at low prices.

The domestic client terminal device 2 is provided with the disk driver 11 as shown in FIG. 1. The disk driver 11 reproduces, upon being loaded with the physical medium 10, the individual archived contents recorded in such physical medium 10. The control section 9 writes, based on the "downloader", the reproduced archived contents into the "writable region" as shown in FIG. 7, which refuses the user application program to intervene. This enables the installation of the individual archived contents into the HDD 16 without connecting the domestic client terminal deice 2 to the server machine 4.

For the case that the physical medium contains only a part of the program, the user who wants to purchase the complete program has to visit a shop to purchase, or to ask the system administrator to send it by post. On the contrary, the physical medium 10 distributed for such entertainment system originally contains the complete program, so that the user immediately use the program without visiting the shop to purchase if only provided with the public key from the system administrator.

The same will apply to the case that apart of the program is distributed through the network. The user who received a part of the program through the network has to make an access to a predetermined server machine to download the complete program when the user wants to purchase it. On the contrary, the archived content distributed for such entertainment system is originally archived and distributed as a complete program, so that the user immediately use the complete program without complicated procedures such as accessing again to the predetermined server machine if only provided with the public key from the system administrator.

For the case that a patch will be provided or data will be added to the content program already installed in the domestic client terminal device 2, such patch data or additional data may be distributed to the user in a form of being stored in the physical medium 10. Or it is also allowable to distribute such patch data or additional data from the server machine 4.

The "downloader" and "extractor", which are system programs stored in the HDD 16 of the domestic client terminal device 2, and public key are designed to be updated in a periodic or non-periodic manner.

The updating is accomplished by up-data distributed to the user in a form of being stored in the physical medium 10 and reproduced by such user, or downloaded from the server machine 4 as one event of the downloading schedule.

The physical medium 10 storing the up-data may be such that containing only the up-data to be distributed to the user, or may be a game disk added with the up-data.

When the physical medium 10 storing the up-data is reproduced, the domestic client terminal device 2 compares a version of the system programs currently stored in the HDD 16 and a version of the up-data reproduced from the physical medium 10. If the version of the up-data reproduced from the physical medium 10 is found to be newer than that of the system programs currently stored in the HDD 16, such up-data reproduced from the physical medium 10 is written over the old "downloader", "extractor" stored in the HDD 16 or over the public keys. This successfully updates the system programs or public keys through off-line procedures.

In such entertainment system, the user can include periodic or non-periodic downloading of the up-data in the downloading schedule. In the entertainment system, downloading of various contents is proceeded according to the schedule defined by the user or the server machine 4, where the up-data can be distributed as one of such downloaded contents.

When the up-data is downloaded, the domestic client terminal device 2 compares a version of the system programs currently stored in the HDD 16 and a version of the downloaded up-data. If the version of the downloaded up-data is found to be newer than that of the system programs currently stored in the HDD 16, such downloaded up-data is written over the old "downloader", "extractor" stored in the HDD 16 or over the public keys. This successfully updates the system programs or public keys while the user being not aware of it.

Last of all, a style of use of such entertainment system will be explained based on a specific example.

Assume now that a role playing game (RPG) is launched from the side of the system administrator. This RPG is very popular, for which purchase by a vast number of users is prospected. Thus the server machine 4 distributes the archived content of the RPG to the domestic client terminal devices 2 of the individual users based on a schedule specified by the user or set on the server machine 4 side irrespective of intention of the purchase.

The server machine 4 now distributes the archived content depending on the congestion status of the network or the priority such as member level of the individual users, as previously explained referring to the flow chart in FIG. 6. When a plurality of users have a same priority, an expedient priority is generated using, for example, random numbers, and based on which the archived content of the RPG is distributed in a time differential manner.

More specifically, assume that one user has specified the active downloading of the RPG through operating the domestic client terminal device 2. The "downloader" of the domestic client terminal device 2 communicates, as instructed by the user, with the server machine 4 to thereby request downloading of the RPG. Upon receiving the request, the server machine 4 refers to traffic on the network. If the traffic is determined as being congested, the RPG is distributed at dawn when the network congestion will be relieved, not immediately. This ensures the distribution of the RPG based on an effective use of the limitative capacity of the network.

Now a user having a high member level can be benefited by an immediate downloading as described in the above.

The archived content of the RPG distributed to the domestic client terminal devices 2 of the individual users is written into the "writable region" of the HDD 16, which can be referred only by the system programs (FIG. 9A). The archived content is decoded into the "readable region" of the HDD 16 only by using the public key provided by the system administrator upon completion of the purchasing procedures by the user.

When the launching of a very popular game is announced, it is often seen that a lot of fans form a long queue at the storefront on the day of launching, and some of them even spend several nights at the storefront before the day of launching. On the other hand, the entertainment system distributes the game content to the domestic client terminal devices 2 of the individual users irrespective of the intention of the purchase, and the decoding and use of the game are only permitted for those completing the purchasing procedures. Thus the users can enjoy the popular game without waiting in the queue at the storefront.

This is also beneficial for the system administrator since it is no more necessary to use a physical medium such as CD-ROM or DVD-ROM in order to distribute the content, which significantly save cost for the content distribution.

The contents distributed from the server machine 4 in the entertainment system are by no means limited to game contents. That is, the server machine 4 of this entertainment system is to distribute, for example, news content, commercial content for informing sport event or concert, information content of new movie and commercial content of new game daily (or at regular intervals) to the domestic client terminal devices 2.

Upon completion of the purchasing procedures by each user, the server machine 4 analyzes the user's taste based on the purchased contents and accumulates the processed data in a statistical database 25 shown in FIG. 1.

The server machine 4 also issues a questionnaire when the user joins this system or in a periodic (or non-periodic) manner for searching taste of the user, analyzes the user's taste based on the answers to the questionnaire and accumulates the processed data in a statistical data base 25 shown in FIG. 1.

The content to be distributed can also be specified by the user, and the server machine 4 accumulates information for indicating an identification of the contents specified by the user into the statistical database 25 shown in FIG. 1.

Thus the server machine 4 refers to the statistical database 25 for every distribution of the content to the user, to thereby ensure distribution of content well matches to the user's taste.

Figure 11:
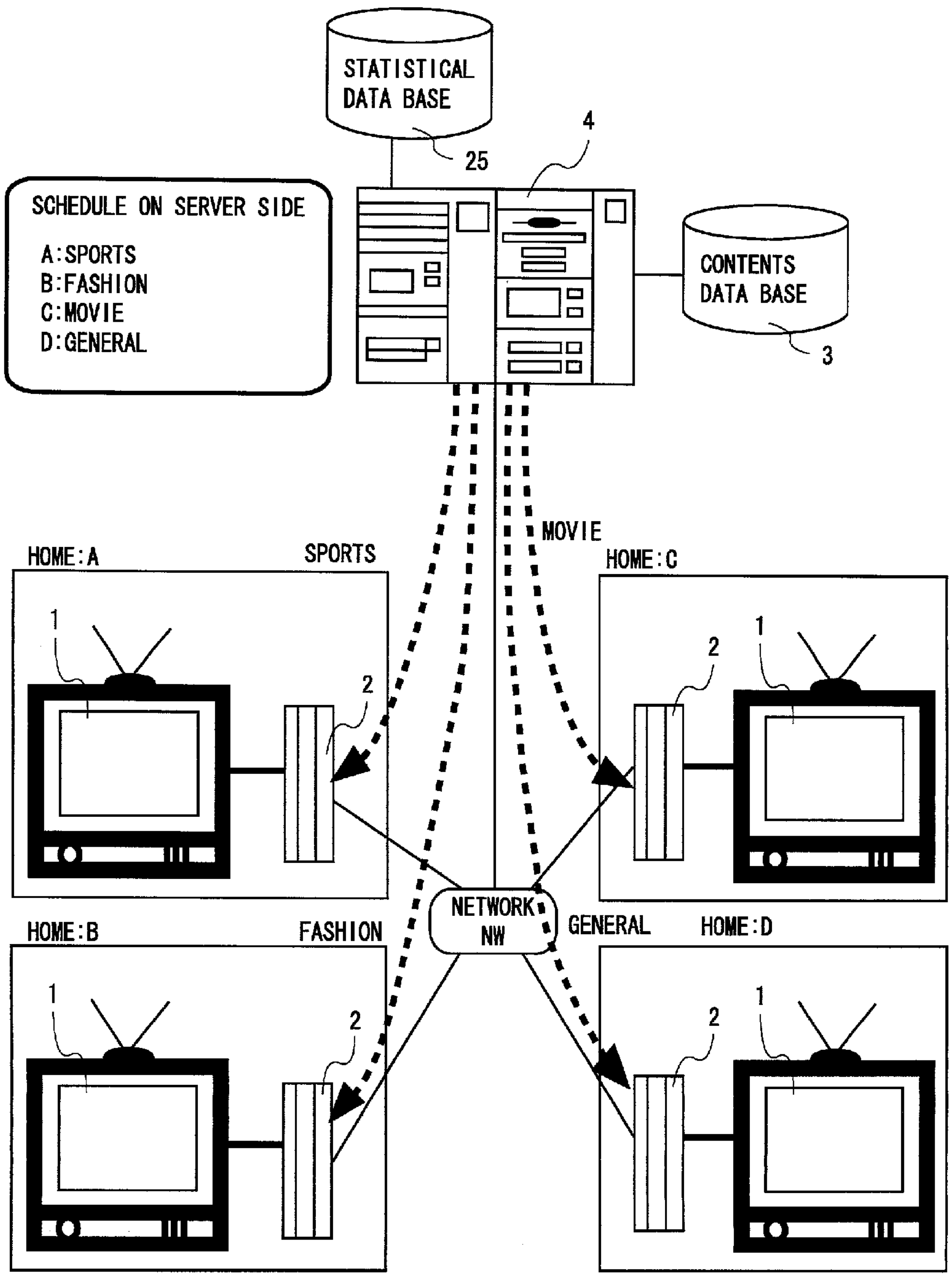
FIG. 11 is a drawing for explaining content distribution based on the users' taste in the entertainment system.

FIG. 11 is a schematic diagram showing content distribution based on the users' taste accumulated in such statistical database 25.

In FIG. 11, when the user at the user's home A completed purchasing procedures for several kinds of sport games, such purchasing history is accumulated in the statistical data base 25. The server machine 4 refers to the statistical data base 25 when it distributes the content to the user. Since the purchasing history of the user indicates that the user is fond of sports, the server machine 4 distributes contents arranged so as to mainly contain sport-related matters.

Similarly, when a questionnaire was issued to the user at the user's home B and the user answered as being interested in fashion, such taste of the user at the user's home B is accumulated in the statistical data base 25. The server machine 4 thus refers to the statistical database 25 and then distributes contents arranged so as to mainly contain fashion-related matters to the user at the user's home B.

Similarly, when the user at the user's home C requested the distribution of movie-related content, information indicating an identification of content requested by the user is accumulated in the statistical data base 25. The server machine 4 thus refers to the statistical database 25 and then distributes contents arranged so as to mainly contain movie-related matters to the user at the user's home C.

For the case that the user at the user's home D has no special request for contents, information corresponding to such user in the statistical data base 25 remains blank or equivalent, so that the server machine 4 distributes contents covering general information on sports, movie, news and the like to the user at the user's home D.

This ensures the content distribution well matches to the users' tastes. From the users' points of view, only the contents in their own tastes (needs) can be downloaded.

While all of such contents may be charged, some content may more preferably be free of charge. In this entertainment system, all of news content, commercial content for informing sport event or concert, information content of new movie and commercial content of new game are free of charge. Decoding of such content does not need the public key, and the "extractor" properly decodes such content without using the public key to thereby allow the users to enjoy the content.

It is supposed that today's life style of the users is often such that waking up in the morning, turning the television set ON, taking a breakfast while looking or listening a television programs such as news, and going out for work. Such television programs are scheduled and edited on the convenience of television stations, and it is thus hard to say that the users truly desire them. Or rather, many of such information are even unnecessary for the users.

By constructing now such entertainment system, contents matched to the user's taste are downloaded daily (or periodically) into the user's domestic client terminal device 2 while the user is sleeping.

If such entertainment system is constructed, the life style of the user will be such that waking up in the morning, checking the contents downloaded into its own domestic client terminal device 2, and obtaining desired information at a desired time, and then going out for work.

It can thus be said that the entertainment system is most promising and is strongly awaited for the construction since it can propose a new life style for the users.

The embodiments described in the above are only part of the examples of the present invention. It is therefore to be understood that the present invention may be practiced in any modifications depending on the design or the like otherwise than as specifically described herein without departing from the scope and the technical spirit thereof.

What is claimed is:

1. A terminal device, comprising:

communication means for accessing a server machine via a network and for downloading content from the server machine;

storage means for storing the downloaded content, the storage means having a first region which only a system program of the terminal device can access, the downloaded content being written into the first region by the system program, and the storage means having a second region from which a user application program can only read out; and storage control means for controlling data stored in the storage means and for moving the content from the first region to the second region based on predetermined information.

2. The terminal device according to claim 1, further comprising:

read-out means for reading out up-data stored in a storage medium, and wherein the storage control means updates at least the system program based on the up-data read out from the storage medium by the read-out means.

3. The terminal device according to claim 1, wherein the communication means downloads up-data from the server machine, and the storage control means updates at least the system program based on the updata downloaded from the server machine by the communication means.

4. The terminal device according to claim 1, wherein the content is archived.

5. A terminal device, comprising:

communication means for accessing a server machine via a network and for downloading content from the server machine;

storage means for storing the downloaded content, the storage means having a first region which only a system program of the terminal device can access, the downloaded content being written into the first region, and a second region from which a user application program can only read out; and storage control means for controlling data stored in the storage means and for moving the content from the first region to the second region;

the storage means having a third region in which both the system program of the terminal device and the user application program can access data generated when the content written into the second region is executed, and the storage control means erasing the data written in the third region at a time when only the system program can intervene.

6. A terminal device, comprising:

communication means for accessing a server machine via a network and for downloading content from the server machine, the content being encrypted;

storage means for storing the downloaded content, the storage means having a first region which only a system program of the terminal device can access and having a second region from which a user application program can only read out, the downloaded content being written into the first region; and storage control means for controlling data stored in the storage means and for moving the content from the first region to the second region, the storage control means reading out and decoding the content written into the first region when a public key associated with the encrypted content is entered and then writing the decoded content into the second region.

7. A terminal device, comprising:

communication means for accessing a server machine via a network and for downloading content from the server machine;

storage means for storing the downloaded content, the storage means having a first region which only a system program of the terminal device can access, the downloaded content being written into the first region, at least one of the system program and the content including a message digest function value; and storage control means for controlling data stored in the storage means, the storage control means inspecting a data string based on the message digest function value.

8. The terminal device according to claim 7, further comprising:

means for collating at least the message digest function value with master data stored in the server machine.

9. The terminal device according to claim 6, further comprising:

means for collating at least the public key with master data stored in the server machine.

10. A terminal device, comprising:

a communication unit operable to access a server machine via a network and operable to download content from the server machine;

a storage unit operable to store the downloaded content, the storage unit having a first region which only a system program of the terminal device can access, the downloaded content being written into the first region by the system program, and the storage unit having a second region from which a user application program can only read out; and a storage control unit operable to control data stored in the storage unit and to move the content from the first region to the second region based on predetermined information.

11. An entertainment system, comprising:

a server machine operable to distribute content via a network to which the server machine is connected; and a terminal device connected to the network and operable to download content from the server machine and to control data stored in a storage unit which stores the downloaded content;

the storage unit having a first region which only a system program of the terminal device can access, the downloaded content being written into the first region by the system program, and the storage unit having a second region from which a user application program can only read out, and the terminal device being operable to move the content from the first region to the second region based on predetermined information.

12. The entertainment system according to claim 11, wherein the terminal device further comprises a read-out unit operable to read out up-data stored in a storage medium, the terminal device being operable to update at least the system program based on the up-data read out from the storage medium by the read-out unit.

13. The entertainment system according to claim 11, wherein the terminal device is operable to download up-data from the server machine, and to update at least the system program based on the up-data downloaded from the server machine.

14. The entertainment system according to claim 11, wherein the content is archived.

15. An entertainment system, comprising:

a server machine operable to distribute content via a network to which the server machine is connected; and a terminal device connected to the network and operable to download content from the server machine and to control data stored in a storage unit which stores the downloaded content;

the storage unit having a first region which only a system program of the terminal device can access, the downloaded content being written into the first region, a second region from which a user application program can only read out, and a third region which both the system program of the terminal device and the user application program can access, and the terminal device being operable to move the content from the first region to the second region, to write into the third region data generated when the content written into the second region is executed, and to erase the data from the third region at a time when only the system program can intervene.

16. An entertainment system, comprising:

a server machine operable to distribute content via a network to which the server machine is connected, the content being encrypted; and a terminal device connected to the network and operable to download content from the server machine and to control data stored in a storage unit which stores the downloaded content;

the storage unit having a first region which only a system program of the terminal device can access and having a second region from which a user application program can only read out, the downloaded content being written into the first region, and the terminal device being operable to move the content from the first region to the second region, the terminal device reading out and decoding the content written into the first region when a public key corresponding to the encryption is entered then writing the decoded content into the second region.

17. The entertainment system according to claim 16, wherein the terminal device is further operable to collate at least the public key with master data stored in the server machine.

18. An entertainment system, comprising:

a server machine operable to distribute content via a network to which the server machine is connected; and a terminal device connected to the network and operable to download content from the server machine and to control data stored in a storage unit which stores the downloaded content;

the storage unit having a first region which only a system program of the terminal device can access and a second region from which a user application program can only read out, the downloaded content being written into the first region, at least one of the system program and the content including a message digest function value, and the terminal device being operable to move the content written from the first region to the second region and to inspect a data string based on the message digest function value.

19. The entertainment system according to claim 18, wherein the terminal device is further operable to collate at least the message digest function value with master data stored in the server machine.

20. A method for managing content, comprising:

writing downloaded content into a first region of a storage unit which only a system program of a terminal device for downloading the content can access; and moving the content written in the first region of the storage unit into a second region of the storage unit from which a user application program can read out only, based on predetermined information.

21. The method for managing content according to claim 20, further comprising:

writing data generated when the content written in the second region of the storage unit is executed into a third region of the storage unit which both the system program and the user application program can access; and erasing the data from the third region of the storage unit at a timing allowing only the system program to intervene.

22. The method for managing content according to claim 20, further comprising:

reading out updata stored in a storage medium; and updating at least the system program based on the up-data read out from the storage medium.

23. The method for managing content according to claim 20, further comprising:

updating at least the system program based on up-data downloaded via a network.

24. The method for managing content according to claim 20, further comprising:

reading out and decoding the content written in the first region of the storage unit upon entering a public key corresponding to the encryption of the content subjected to the encryption; and writing the read-out content into the second region of the storage unit.

25. The method for managing content according to claim 24, further comprising:

inspecting the public key by collating at least the public key with master data stored in the server machine.

26. The method for managing content according to claim 20, further comprising:

inspecting a data string based on a message digest function value included in at least one of the system program and the content.

27. The method for managing content according to claim 26, further comprising:

inspecting the message digest function value by collating at least the message digest function value with master data stored in the server machine.

28. The method for managing content according to claim 20, wherein the content is archived.

29. A storage medium having recorded therein an information processing program to be executed on a computer, wherein the information processing program comprises:

writing downloaded content into a first region of a storage unit which only a system program of a terminal device for downloading the content can access; and moving the content written in the first region of the storage unit into a second region of the storage unit from which a user application program can read out only, based on predetermined information.

30. The storage medium according to claim 29, wherein the information processing program further comprises:

reading out up-data stored in a storage medium; and updating at least the system program based on the up-data read out from the storage medium.

31. The storage medium according to claim 29, wherein the information processing program further comprises:

updating at least the system program based on up-data downloaded via a network.

32. The storage medium according to claim 29, wherein the information processing program further comprises:

reading out and decoding the content written in the first region of the storage unit upon entering a public key corresponding to the encryption of the content subjected to the encryption; and writing the read-out content into the second region of the storage unit.

33. The storage medium according to claim 32, wherein the information processing program further comprises:

inspecting the public key by collating at least the public key with master data stored in the server machine.

34. The storage medium according to claim 29, wherein the information processing program further comprises:

inspecting a data string based on a message digest function value included in at least one of the system program and the content.

35. The storage medium according to claim 34, wherein the information processing program further comprises:

inspecting the message digest function value by collating at least the message digest function value with master data stored in the server machine.

36. The storage medium according to claim 29, wherein the content is archived.

37. The storage medium according to claim 29, wherein the information processing program further comprises:

writing data generated when the content written in the second region of the storage unit is executed into a third region of the storage unit which both the system program and the user application program can access; and erasing the data from the third region of the storage unit at a timing allowing only the system program to intervene.

* * * * *